United States Patent [19]

Gottzein et al.

[11] 4,233,905
[45] Nov. 18, 1980

[54] MAGNETICALLY SUSPENDED VEHICLE

[75] Inventors: Eveline Gottzein, Oberpframmern; Christian Roche; Gerhard Bohn, both of Munich, all of Fed. Rep. of Germany

[73] Assignee: Messerschmitt-Bölkow-Blohm GmbH, Munich, Fed. Rep. of Germany

[21] Appl. No.: 815,000

[22] Filed: Jul. 12, 1977

[30] Foreign Application Priority Data

Jul. 27, 1976 [DE] Fed. Rep. of Germany ....... 2633647

[51] Int. Cl.² .................... B61B 13/08; B61F 5/00; B61F 5/50
[52] U.S. Cl. .............................. 104/281; 105/157 R; 308/1 D
[58] Field of Search .... 104/148 R, 148 LM, 148 MS, 104/148 SS; 105/77, 182 E, 157 R; 308/1 D

[56] References Cited

U.S. PATENT DOCUMENTS

| 3,516,364 | 6/1970 | Machefert-Tassin | 104/148 LM X |
|---|---|---|---|
| 3,822,647 | 7/1974 | Hill et al. | 104/148 MS |
| 3,937,148 | 2/1976 | Simpson | 104/148 MS |
| 3,995,724 | 12/1976 | Katzer | 105/77 |
| 4,029,020 | 6/1977 | Nakamura et al. | 105/182 E X |

FOREIGN PATENT DOCUMENTS

| 2146500 | 4/1973 | Fed. Rep. of Germany | 104/148 MS |
|---|---|---|---|
| 2342734 | 4/1975 | Fed. Rep. of Germany | 104/148 MS |
| 2407522 | 8/1975 | Fed. Rep. of Germany | 104/148 MS |
| 2511382 | 9/1976 | Fed. Rep. of Germany | 104/148 MS |

Primary Examiner—John J. Love
Assistant Examiner—Howard Beltran
Attorney, Agent, or Firm—Toren, McGeady and Stanger

[57] ABSTRACT

The magnets supporting a magnetic suspension vehicle are vibrationally isolated from the vehicle body by mounting a number of the magnets on each chassis with individual spring arrangements whose reactive moments are greater than the pitch and roll moments tending to deflect the magnets.

3 Claims, 3 Drawing Figures

MAGNETICALLY SUSPENDED VEHICLE

REFERENCE TO RELATED COPENDING APPLICATIONS

This application is related to the copending application Ser. No. 802,876, filed June 2, 1977, in the names of Eveline Gottzein, Friedrich Ossenberg-Franzes, Christian Roche, and assigned to the same assignee as the present application. The subject matter therein is hereby made a part of this application as if recited herein. The copending application is that of different inventors and discloses subject matter similar to, but not the same as, the present application.

BACKGROUND OF THE INVENTION

This invention relates to magnetically suspended vehicles and particularly magnetic suspension railroad vehicles.

In order to improve the riding comfort of magnetic suspension vehicles, so-called secondary suspensions have been interposed between the vehicle's chassis, with its supporting and guide magnets, and the superstructure or car body. These suspensions are often suitable for preventing annoying vibrations in the body due to alignment errors in the track. Such vibratory decoupling of the magnetically suspended chassis from the superstructure of the car to prevent vibrations by spring mounting the mass of the body naturally imposes a lower dynamic load on the magnets than a magnetic suspension car with rigidly mounted magnets.

The resulting reduction of the dynamic loads may possibly suffice for magnetic suspension railways whose line, composed of the substructure and rails, is dynamically rigid and whose rails are very accurately aligned. However, this possibility must be disregarded for economic reasons. The ordinary line is elastic and the rails exhibit alignment errors.

As is known, the additional reduction needed in the dynamic load of the magnets can be achieved by using a single relatively elastic suspension chassis. However, such chasses form undesirably difficult vibration structures, with unstable bending vibrations, which must be actively stabilized by regulating devices.

Consideration has been given to a so-called resilient single magnet suspension. There, the magnets form the links of a magnet chain composed of several individual magnets arranged in series in the longitudinal direction of the car. The magnets are connected with the magnetic suspension vehicle over a suspension acting parallel to its magnetic force. The suspension requires positive or cross-head guides for the individual magnets. The entire arrangement requires a relatively large structural expenditure for the magnetic suspension vehicle. If the expenditure is not made, the individual magnets may be deflected about their pitch and roll axes. As a result, they may strike against the associated rail. This is so because, without special precautions, a single resiliently mounted magnet is unstable in three ways. Specifically, it is unstable with regard to translatory movements and the direction of the action of the magnetic force. It is unstable with regard to pitching movements. It is also unstable with respect to rolling movements. However, only the translatory instability can be eliminated by control arrangements.

An object of the invention is to provide a magnetic suspension vehicle of the above mentioned type with a resilient single magnet suspension without the aforementioned positive guides, etc., which nevertheless avoid deflection of the individual magnet about its pitch and roll axes.

SUMMARY OF THE INVENTION

According to a feature of the invention, separate resilient spring means support each magnet and restrain its mass enough so that the stabilizing moments resulting from the deflections of the magnet about its pitch and roll axes are greater than the pitch and roll moments deflecting the magnet.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
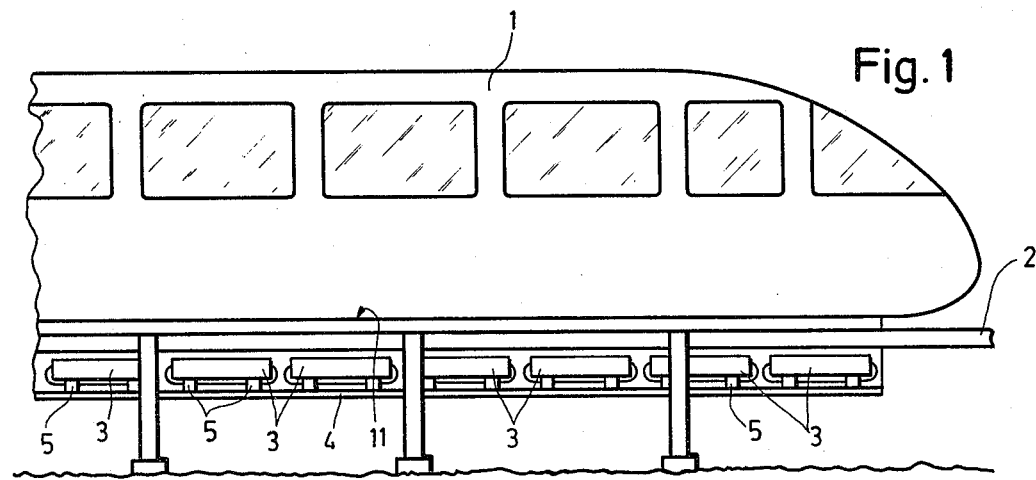
FIG. 1 is a side elevation showing a section of a magnetic suspension vehicle and a rail arrangement.
Figure 2:
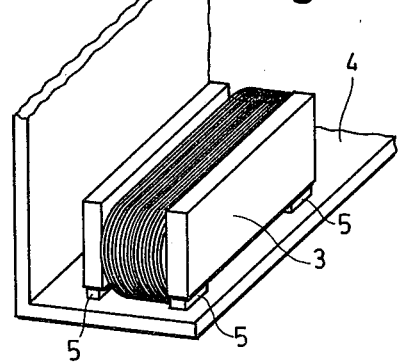
FIG. 2 is a perspective view showing a detail of a magnet in FIG. 1.

In FIG. 1, a magnetic suspension vehicle 1 is held and guided between supported ferromagnetic rails 2 and magnets 3 utilizing magnetic attractive force. Of the magnets 3, only the support magnets are shown. The magnets 3 rest on a common girder or magnet support 4 which is mounted on the bottom 1.1 of the magnetic suspension vehicle 1. A shown in FIG. 2, the connection of each individual magnet 3 with the girder 4 is established by means of a spring arrangement wherein the magnet 3 supports itself at each of its four corner areas by means of a spring element 5 made, for example of rubber. Because cross head guides or the like for the magnets 3 have been eliminated, the resilient arrangement permits the magnet to perform translatory motion in the operating direction of the magnetic force, and hence normal, as well as angular movements about its pitch and roll axes.

With regard to these angular movements, the spring elements 5 of the spring arrangement have their spring constants selected on the basis of their mutual distances so that the pitch and roll movements deflecting the magnet 3 cannot result in destabilization. This makes striking of the magnet 3 against the rail 2 in FIG. 1 impossible. Destabilizing translatory movements of the magnet 3 is also prevented by corresponding regulation of its excitation by known means.

Figure 3:
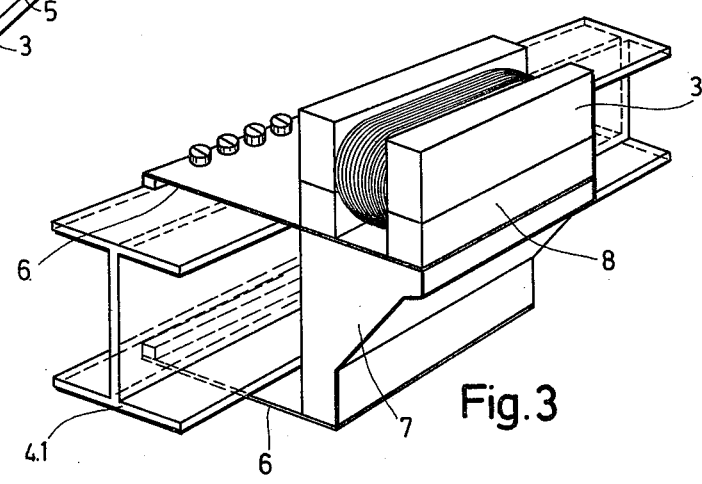
FIG. 3 is a perspective view illustrating the magnet structure relative to an associated rail.

FIG. 3 illustrates another embodiment of the invention. The latter also achieves the requirement for a relatively stiff resilient arrangement of the magnet 3 with respect to angular movements about its pitch and roll axes and simultaneously soft resilience relative to translatory movements in the direction of the effect of the magnetic force. Here, two substantially parallel spring plates are comparatively flexible in the direction of the action of the magnetic force but otherwise stiff. The spring plates 6 are screwed to the girder 4 which is in the form of an eye beam 4.1. The plates are stiffened at the opposite free end by an interpositioned bracket 7 that holds the magnet 3. The latter rests on rigid nonmagnetic spacers 8.

In the aforementioned embodiments, the spring arrangement or suspension of each magnet 3 permits not only translatory movement in the direction of the action of the magnetic force, but also angular movement about the pitch and roll axes. This produces further dynamic relief of the magnets. The spring arrangement or suspension is constructed within the framework of given stability criteria. Thus, in addition to its function of uncoupling the magnet and superstructure to prevent vibrations, the suspension according to the invention also performs a stabilizing function.

According to the invention, the natural destabilizing pitch moments $M_n$ and roll moments $M_r$ are determined experimentally with a dynamometer while the magnets are supported on pressure gauges. The pitch and roll moments may be determined by considering the relatively small deflections of the magnet. The moment $M_n = M_{no} + c_n L_n$. The moment $M_r = c_r L_r$. Here, $c_n$ and $c_r$ are the measured destabilizing moment constants and $L_n$ and $L_r$ are the pitch and roll angles. The moment $M_{no}$ is caused by eddy currents in a stationary rail associated with the magnet and depends substantially only upon the speed of the car and is thus also measurable.

On the basis of these pitch and roll moment constants and the stationary moment $M_{no}$, the spring constants of the spring elements are selected for suspension of the magnet in connection with the effective lever arms (i.e. the distance between the spring elements). Thus, with small deflections, the stabilizing moments are at least as great as the measured pitch and roll moments. The selection and arrangement and distances of the spring elements can be determined by suitable tests.

While embodiments of the invention have been described in detail, it will be evident to those skilled in the art that the invention may be embodied otherwise without departing from its spirit and scope.

What is claimed is:

1. A magnetic suspension vehicle for use with a rail, comprising a vehicle body, a plurality of suspension magnets, a carrier mounted on the body for carrying said magnets and positioning the magnets beneath the rail, said magnets being longitudinally aligned, a plurality of spring means each individually coupling one of the magnets to said carrier, said vehicle when operating subjecting said magnets to pitch and roll moments, said spring means each having a size and spring constant to impart stabilizing moments to the magnets in the pitch and roll axes which are greater than the pitch and roll moments to which each of said magnets is subjected.

2. A vehicle as in claim 1, wherein each of said spring means includes a plurality of spring elements supporting a portion of one of said magnets, said elements being spaced from each other.

3. A vehicle as in claim 1, wherein said spring means including a pair of flat resilient plates cantilevered from said carrier, a bracket between the cantilevered ends of said plates for securing said plates to each other, one of said plates being located above the other, and rigid means securing the upper one of said plates to one of said magnets.

* * * * *